United States Patent [19]

Reissig et al.

[11] Patent Number: 4,909,025

[45] Date of Patent: Mar. 20, 1990

[54] DRIVE UNIT FOR HARVESTER BLADE ASSEMBLY

[75] Inventors: Peter Reissig, Neustadt; Manfred Hille, Berthelsdorf; Manfred Tetchmann; Bernd Zumpe, both of Bischofswerder; Michael Beck, Neustadt; Rudolf Simon, Sebnitz; Arndt Düring, Helmsdorf, all of German Democratic Rep.

[73] Assignee: Veb Combinat Fortschritt-Landmaschinen, Neustadt/Sachsen, German Democratic Rep.

[21] Appl. No.: 231,885

[22] Filed: Aug. 12, 1988

[30] Foreign Application Priority Data

Aug. 14, 1987 [DD] German Democratic Rep. ..................................... 3060334

[51] Int. Cl.$^4$ ............................................. A01D 34/02
[52] U.S. Cl. ....................................... 56/257; 56/296; 56/297
[58] Field of Search .................. 56/296, 297, 260–263, 56/270; 74/11

[56] References Cited

U.S. PATENT DOCUMENTS

| | | | |
|---|---|---|---|
| 1,647,867 | 11/1927 | Hutsell | 56/297 |
| 2,269,774 | 1/1942 | Lawrence | 56/263 |
| 2,787,111 | 4/1957 | Templeton | 56/297 |
| 3,094,832 | 6/1963 | Lee | 56/263 |
| 4,023,334 | 5/1977 | Heath | 56/297 |
| 4,067,179 | 1/1978 | Schneider | 56/297 |
| 4,815,265 | 3/1989 | Guinn et al. | 56/296 |

OTHER PUBLICATIONS

Henry T. Brown, *Mechanical Movements*, 1893, pp. 12–13.

Primary Examiner—Stephen J. Novosad
Assistant Examiner—Gay Ann Spahn
Attorney, Agent, or Firm—Herbert Dubno; Andrew Wilford

[57] ABSTRACT

A blade assembly normally driven by a power takeoff shaft has a frame normally displaced in a travel direction and provided with a pair of blade carriers horizontally reciprocal transverse to the direction. The drive unit comprises a right-angle transmission having a horizontal input connected to the power takeoff shaft and a vertical output, a vertical shaft offset from the output and having a pair of angularly offset eccentrics, and a belt drive interconnecting the transmission output and the vertical shaft. A pair of relatively long actuating arms extending in the direction flank the transmission and shaft and have rear ends pivoted on the frame and front ends connected to the respective blade carriers. A pair of respective connector plates extending transversely of the direction have respective inner ends carried on the eccentrics and outer ends connected to the arms between the ends thereof. The frame comprises side plates extending in the direction and transversely bridged by front, center, and rear bars.

7 Claims, 3 Drawing Sheets

DRIVE UNIT FOR HARVESTER BLADE ASSEMBLY

FIELD OF THE INVENTION

The present invention relates to a field harvester. More particularly this invention concerns a drive unit for a removable blade assembly for a field chopper or the like.

BACKGROUND OF THE INVENTION

A cutter-bar drive is described in East German patent 227,870 which can be mounted as a unit at any location on the intake trough of a field harvester. It has in the center of its frame underneath the intake trough a blade drive that can be mounted as two separate halves between the struts of the frame. A drive shaft carrying an eccentric disk is carried on the two halves. Cranks connected to the eccentric disk are fitted with connecting rods that are pivoted on L-shaped levers whose free ends are in turn pivoted on the blade bars. Thus rotation of the eccentric oppositely reciprocates these blade bars.

Such a blade assembly has the disadvantage that it vibrates considerably, generating substantial throw because of the codirectional movement of most of its parts. The machine therefore generates considerable noise. Furthermore the bearings for the L-shaped actuating arms are subjected to substantial wear, and any vertical displacement of the blade bars, as for instance when they engage a rock or wire, puts substantial stress on the assembly. In addition the small actuating arms must be specially coupled to the blade bars as their ends attached to these arms describe arcs as the arms oscillate, and the bars must move primarily in a straight line. The result is substantial wear of the backs of the individual blades and the lateral guides for the blades must be relatively loose, thereby encouraging the generation of more noise.

In East German patent 216,458 another blade-assembly drive is described which is aimed at extremely widemouth machines. A power takeoff shaft behind the cutter trough is connected on both sides to connecting rods connected via angle arms to the blade bars. These arms extend outside past the sides of the machine where they can be fouled with crop. Once again this machine generates considerable noise and vibration.

OBJECTS OF THE INVENTION

It is therefore an object of the present invention to provide an improved drive unit for a harvester blade assemlby.

Another object is the provision of such a blade-assembly drive unit which operates silently and which is of simple and compact construction.

SUMMARY OF THE INVENTION

These objects are attained according to this invention in a blade assembly normally driven by a power takeoff shaft and having a frame normally displaced in a travel direction and provided with a pair of blade carriers horizontally reciprocal transverse to the direction. The drive unit comprises a right-angle transmission having a horizontal input connected to the power takeoff shaft and a vertical output, a vertical shaft offset from the output and having a pair of angularly offset eccentrics, and a belt drive interconnecting the transmission output and the vertical shaft. A pair of relative long actuating arms extending in the direction blank the transmission and shaft and have rear ends pivoted on the frame and front ends connected to the respective blade carriers. A pair of respective connector plates extending transversely of the direction have respective inner ends carried on the eccentrics and outer ends connected to the arms between the ends thereof. The frame comprises side plates extending in the direction and transversely bridged by front, center, and rear bars.

With this arrangement the moving parts of the system are all set up in symmetrical pairs that move identically oppositely, thereby substantially perfectly balancing out all forces in the machine. In addition the use of long actuating arms means that their front ends move almost in straight lines, eliminating the conversion of oscillation to reciprocation of the prior-art assemblies.

According to further features of the invention the arms are provided at their rear-end pivots with cushioned bearings and similar cushions are provided where they are connected to the respective connector plates. In addition the rear end of each arm is verticlaly offset from the respective front end and the front ends are substantially level with each other. The input of the transmission is provided with an elastic coupling connected to the power takeoff shaft and means is provided for displacing and securing this transmission in the frame.

To compensate for vertical deflection of the arms the connecting plates are of spring steel. In addition in order to prevent crop from getting into the drive unit the frame has upper and lower front bars forming respective slots through which the front ends of the arms engage. These slots are provided with upper and lower guides for the arm front ends and the arm front ends are provided with shields projecting past the slots and preventing crop from entering therein. Furthermore elastic mounts connect the arm front ends to the respective blade bars to further avoid any damage to the drive if the blades themselves are deflected upward.

DESCRIPTION OF THE DRAWING

The above and other objects, features, and advantages will become more readily apparent from the following, reference being made to the accompanying drawing in which.

SPECIFIC DESCRIPTION

Figure 1:
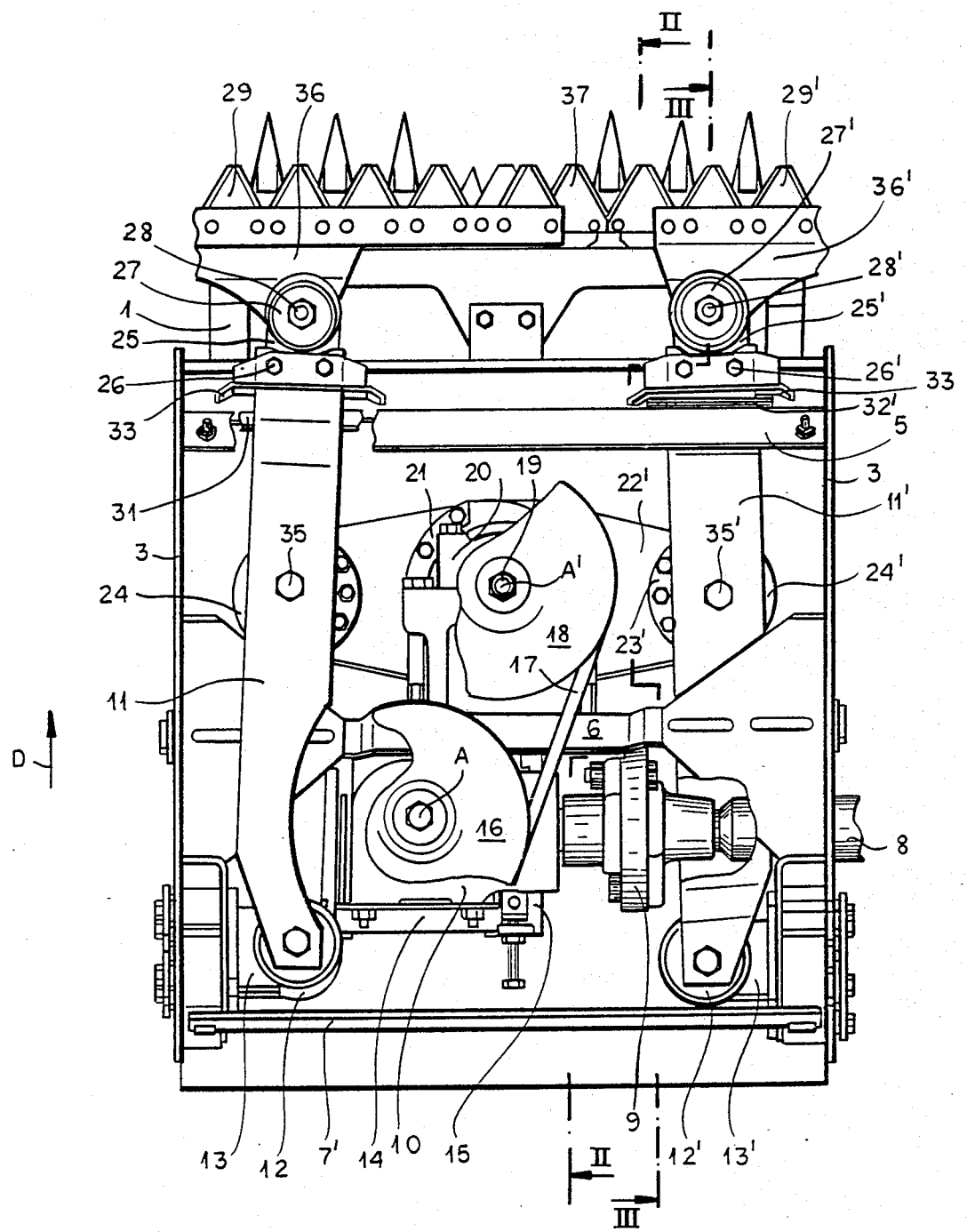
FIG. 1 is a partly sectional top view of the cutter-bar assembly of this invention.
Figure 2:
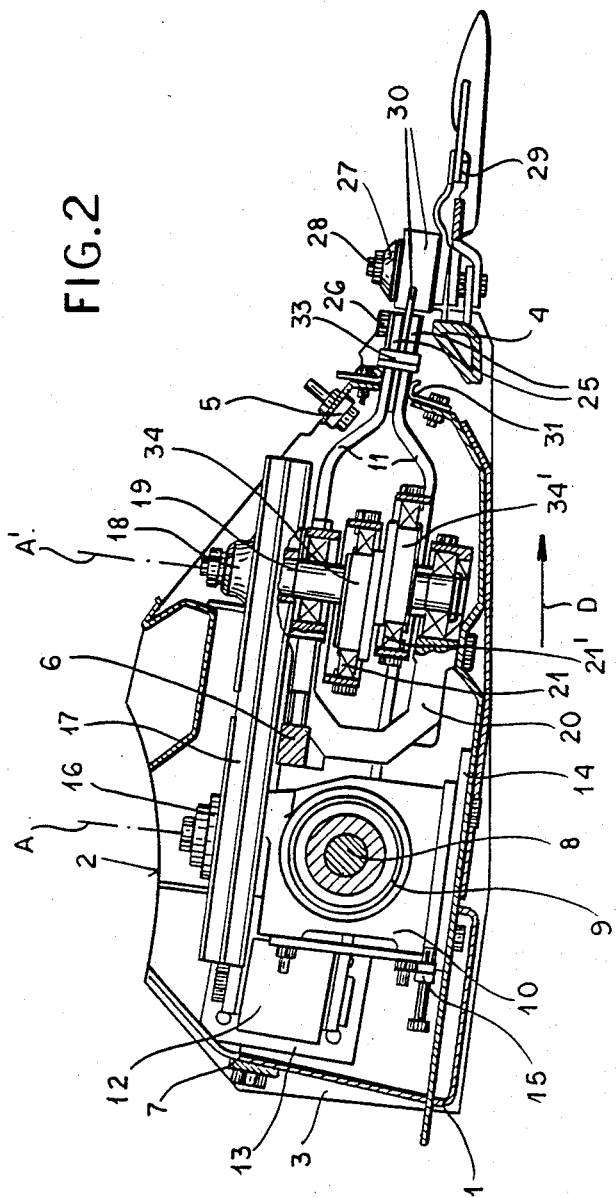
FIGS. 2 and 3 are sections taken respectively along lines II—II and III—III of FIG. 1.
Figure 3:
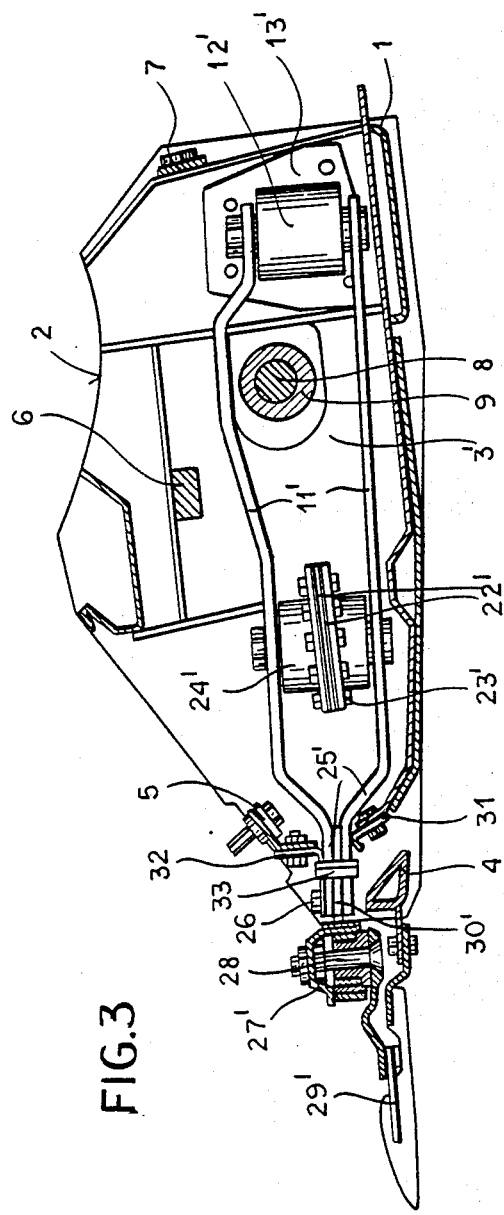

As seen in FIGS. 1 through 3 the cutter-bar assembly according to this invention has a frame 1 normally attached to the front of a tractor that displaces it in a normal horizontal travel direction D. The frame is basically comprised of right and left side plates 3 and 3' spanned by a lower front bar 4, an upper front bar 5, central and rear stiffening struts 6 and 7, and a bottom plate 14, all generally below the trough plate 2 of the harvester to which the machine is attached.

The cutter-bar assembly receives power from a front power-takeoff shaft 8 extending horizontally underneath the trough 2 and received in an elastic bearing 9 of a right-angle bevel-gear transmission 10 having an output centered on an upright axis A and carrying a double- V-belt pulley 16. The position of the transmission 15 can be adjusted by spindles 15. A pair of V-belts 17 reeved over this pulley 16 are also engaged over a front double pulley 18 centered on an axis A' defined by a shaft 19 centered in upper and lower bearings 20 fixed in the frame 1. This shaft 19 carried upper and lower eccentric disks 34 and 34' offset by 180° to one another.

A pair of relatively long lever arms 11 and 11' each formed by an upper bar and a lower bar have rear ends supported in elastic mounts 12 and 12' in pivots 13 and 13' at the rear corners of the frame 1 on the sides 3 and 3'. The positions of these pivot bearings 13 and 13' can be adjusted on the side plates 3 and 3' and normally the arm 11 is slightly above the arm 11' and both the arms 11 and 11' are aligned on center with respective eccentric disks 34 and 34'.

Figure 4:
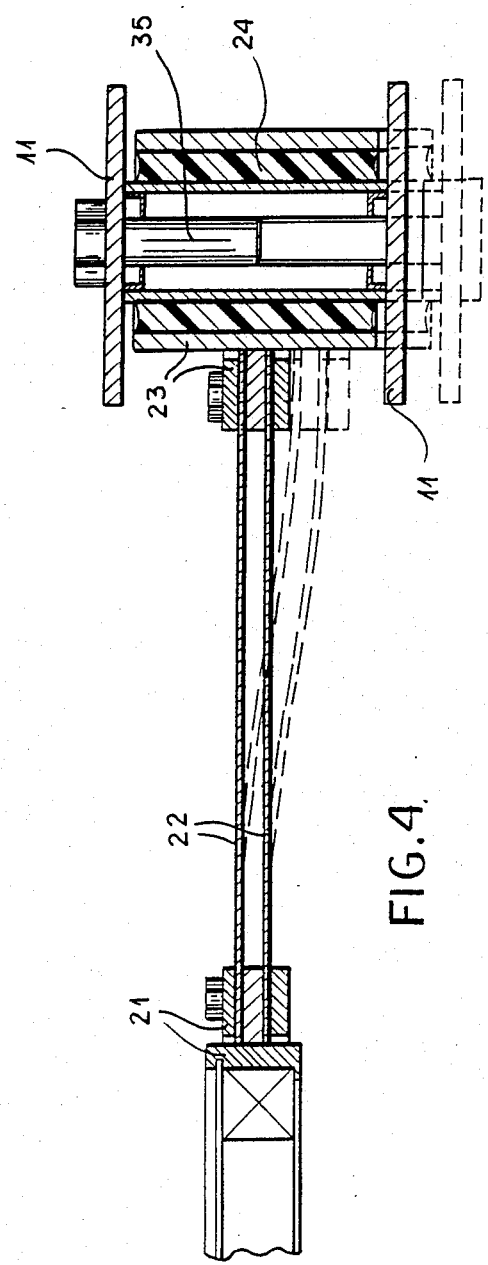
FIG. 4 is a side view in enlarged scale of a detail of FIG. 1.

The disks 34 and 34' are surrounded by respective bearing rings 21 and 21' carried in the inner ends of respective connecting plates 22 and 22' whose outer ends are connected as also shown in FIG. 4 to rings 23 and 23' riding via respective bearings 24' on pivots 35 and 35' each situated about two-thirds of the way forward in the direction D from the pivoted rear ends of the respective arms 11 and 11'. Each of the plates 22 and 22' is formed by a pair of stiff but flexible spring-steel members to permit some relative vertical displacement between the rings 21 and the rings 23 while still transmitting substantial force in a direction transverse to the travel direction D.

The extreme front ends of the two bars forming each of the arms 11 and 11' are bent up and down to form adjacent tabs 25 and 25' which are secured by bolts 26 and 26' to respective blade carriers 30 and 30'. The frame members 5 and 6 are provided with downwardly and upwardly directed slide members 32 and 31 which vertically engage and support the respective tabs 25 and 25' and these tabs 25 and 25' are provided with outwardly projecting angle bars 33 that prevent cut crop from getting into the frame at the slots where the arms 11 and 11' project from it.

The blade carriers 30 and 30' are connected via respective shock mounts 27 and 27' and bolts 28 and 28' to plates 36 carrying respective blades 29 and 29' that can slide horizontally transverse to the direction travel D on lower stationary blades 37.

Thus in use the rotation of the shaft 8 is converted into rotation about the axis A of the eccentrics 34 and 34' which is converted into reciprocation of the connector plates 22 and 22' so as to oppositely but identically oscillate the arms 11 and 11' about the vertical axes of their respective pivots 13 and 13'. Since these arms 11 and 11' are relatively long this motion will be transformed into nearly perfect straight-line movement of their extreme front ends, and the shock mounts 27 and 27' will in fact allow the blade carriers 36 and 36' to move in perfectly straight lines. All of the movement in the machine is basically balanced between elements moving in one direction and identical elements moving identically in the opposite direction, so that the machine operates substantially without vibration or throw.

We claim:

1. In a blade assembly normally driven by a power takeoff shaft and having a frame normally displaced in a travel direction and provided with a pair of blade carriers horizontally reciprocal transverse to the travel direction, a drive unit comprising:
    a right-angle transmission having a horizontal input connected to the power takeoff shaft and a vertical output, the frame having upper and lower front bars forming two slots spaced apart transversely of the travel direction;
    a vertical shaft offset from the output and having a pair of angularly offset eccentrics;
    a belt drive interconnecting the transmission output and the vertical shaft;
    a pair of relatively long actuating arms extending in the travel direction, flanking the transmission and shaft on both transverse sides, and having rear ends pivoted on the frame and front ends extending through the respective slots and connected to the respective blade carriers;
    guides on the frame at the slots for the arm front ends;
    shields on the arm front ends projecting transversely of the travel direction past the slots and preventing crop from entering the slots; and
    a pair of respective connector plates extending transversely of the travel direction and having respective inner ends carried on the eccentrics and outer ends connected to the arms between the ends thereof.

2. The blade-assembly drive unit defined in claim 1 wherein the frame comprises side plates extending in the travel direction and transversely bridged by front, center, and rear bars.

3. The blade-assembly drive unit defined in claim 1 wherein the arms are provided at their rear-end pivots with cushioned bearings and similar cushions are provided where they are connected to the respective connector plates.

4. The blade-assembly drive unit defined in claim 1 wherein the rear end of each arm is vertically offset from the respective front end and the front ends are substantially level with each other.

5. The blade-assembly drive unit defined in claim 1 wherein the input of the transmission is provided with an elastic coupling connected to the power takeoff shaft and means is provided for displacing and securing this transmission in the frame.

6. The blade-assembly drive unit defined in claim 1 wherein the connecting plates are of spring steel.

7. The blade-assembly drive unit defined in claim 1, further comprising elastic mounts connecting the arm front ends to the respective blade bars.

* * * * *